United States Patent
Nakano et al.

(10) Patent No.: US 8,203,102 B2
(45) Date of Patent: Jun. 19, 2012

(54) THERMAL TYPE FLOW SENSOR

(75) Inventors: Hiroshi Nakano, Hitachi (JP); Masamichi Yamada, Hitachinaka (JP); Masahiro Matsumoto, Hitachi (JP); Izumi Watanabe, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 52 days.

(21) Appl. No.: 12/724,399

(22) Filed: Mar. 15, 2010

(65) Prior Publication Data
US 2010/0170335 A1    Jul. 8, 2010

Related U.S. Application Data

(62) Division of application No. 11/627,111, filed on Jan. 25, 2007.

(30) Foreign Application Priority Data

Feb. 3, 2006 (JP) ................................. 2006-027221

(51) Int. Cl.
*H05B 1/01* (2006.01)
(52) U.S. Cl. ......... 219/483; 219/499; 219/501; 219/505
(58) Field of Classification Search .................. 219/494, 219/497, 499, 501, 504, 505
See application file for complete search history.

(56) References Cited

U.S. PATENT DOCUMENTS

| | | | |
|---|---|---|---|
| 5,193,388 | A | 3/1993 | Kleinhans |
| 5,375,466 | A | 12/1994 | Konzelmann |
| 5,623,097 | A | 4/1997 | Horiguchi et al. |
| 5,635,635 | A | 6/1997 | Tsukada et al. |
| 6,349,596 | B1 | 2/2002 | Nakada et al. |
| 6,729,183 | B2 | 5/2004 | Tanimoto et al. |
| 6,871,536 | B2 | 3/2005 | Ariyoshi |
| 2003/0041664 | A1 | 3/2003 | Ariyoshi |
| 2005/0000281 | A1 | 1/2005 | Konzelmann et al. |

FOREIGN PATENT DOCUMENTS

| | | |
|---|---|---|
| DE | 3429729 | 7/1986 |
| EP | 1 376 073 | 1/2004 |
| EP | 1411327 | 4/2004 |
| EP | 1541974 | 6/2005 |
| JP | 06317443 | 11/1994 |
| JP | 2002365114 | 12/2002 |
| JP | 2004-012358 | 1/2004 |
| JP | 2004-340936 | 12/2004 |
| JP | 2004-361271 | 12/2004 |
| JP | 2005-172463 | 6/2005 |
| JP | 2006-064710 | 3/2006 |
| JP | 2006-098057 | 4/2006 |

OTHER PUBLICATIONS

Office Action in European Patent Application No. 07 001 772.8-2209, mailed Apr. 14, 2009. Office Action in Chinese Patent Application No. 200710001728.6 mailed Jun. 13, 2008 (with English translation).
Extended European Search Report in European Application No. 08021915.7-2209, dated Apr. 22, 2009.
Japanese Office Action mailed Mar. 29, 2011 in corresponding Japanese Patent Application No. 2006-027221 and its partial English translation.

*Primary Examiner* — Mark Paschall
(74) *Attorney, Agent, or Firm* — Brundidge & Stanger, P.C.

(57) ABSTRACT

A thermal type flow sensor measures a flow rate of a fluid by means of a heat resistive element having a temperature dependency. The sensor is comprised of: plural heat resistive elements used for a flow rate measurement; and a driver circuit for controlling a current applied to these heat resistive elements to cause their heating. The driver circuit is configured to sense a resistance change of a lower-temperature side heat resistive element among the plural heat resistive elements and to control the current to be applied to the plural heat resistive elements in accordance with a sensed value of the lower-resistance's variation.

11 Claims, 15 Drawing Sheets

THERMAL TYPE FLOW SENSOR

This application is a divisional application of U.S. application Ser. No. 11/627,111, filed Jan. 25, 2007, the entirety of which is incorporated herein by reference.

CLAIM OF PRIORITY

The present application claims priority from Japanese application serial no. 2006-027221, filed on Feb. 3, 2006, the contents of which are hereby incorporated by references into this application.

BACKGROUND ART

The present invention relates to a thermal type flow sensor that measures a flow rate of a fluid such as air flow by using a heat resistive element (temperature sensitive resistive element) having a temperature dependency.

The thermal type flow sensor controls a current flowing through a heat resistive element so as to maintain a temperature difference between the heat resistive element whose heat is taken away with the fluid to be measured and a temperature compensation resistor a constant temperature difference. In order to carry out the current control, the thermal type flow sensor includes a bridge circuit with the heat resistive element and the temperature compensation resistive element and a driver circuit which controls the current flowing through the bridge circuit so that a potential difference between two middle points of the bridge circuit becomes zero. The driver circuit comprises a differential amplifier circuit and a transistor.

The thermal type flow sensor is suitable for a sensor that measures a intake air flow rate of, for example, a vehicle engine because the thermal type flow sensor is capable of directly measuring a mass flow rate. In addition, a thermal type flow sensor of the substrate type is known recently. This type flow sensor has temperature sensitive resistive elements such as a heat resistive element and a temperature compensation resistive element, which are micro-processed on a semiconductor substrate made of silicon or the like through a micromachining technique. Attention is paid to the thermal type flow sensor of the silicon substrate type because of the small size, the low power consumption, and the low costs.

The thermal type flow sensor of the silicon substrate type is disclosed in, for example, JP-A 2004-012358 and JP-A 2004-340936.

In the disclosure of the publications, all of the resistors in the bridge circuit are formed of resistive elements of the same material on the same substrate. As a result, the resistive elements that constitute the bridge circuit have the same characteristics. As those resistive elements may vary with time at the same rate if the conditions are same, the total balance of the bridge circuit may not vary. Therefore, it is possible to maintain a precision in the measurement for a long period of time.

However, in the bridge circuit of the thermal type flow sensor, there are various resistive elements with different heat conditions respectively, for example, one of which is a heat resistive element that heats at a high temperature, and the other is a resistive element (temperature sensitive resistive element) that is used substantially at a room temperature. As a generally trend, the heat resistive element become thermally deteriorated as the element is used, and is liable to be deteriorated as compared with the remaining resistive element. Accordingly, the characteristics of the sensor may be varied with time. The deterioration of the heat resistive element causes the bridge balance to be varied. The above phenomenon leads to an error in the temperature difference control of the resistive element and the deterioration of a precision in the flow rate measurement.

A sensor disclosed in JP-A 2004-340936 is configured to sense the temperature of the heat resistive element indirectly by the aid of the temperature sensitive resistive element that is disposed in the vicinity of the heat resistive element, so that the temperature of the heat resistive element is controlled on the basis of the indirectly sensed temperature value. In this case, because the temperature sensitive resistive element for the temperature sensing element is lower in the temperature than the heat resistive element, it is possible to reduce the thermal deterioration of the temperature sensitive resistive element. However, in the above configuration, because a thermal transmission delay from the heat resistive element to the temperature sensitive resistive element occurs, a response is delayed as much. Also, because a reference power supply is used for a driver circuit, the sensor is affected by a fluctuation of the reference power supply.

Also, the characteristic variation of the sensor is caused by a stress of the mounted member. Most of the thermal type flow sensors have a sensor element fixed with an adhesive. Also, a sealant such as an epoxy resin is used to protect wire bonding for taking out an electric signal from the sensor element.

The above adhesive and sealant expand and contract due to a change in the surrounding temperature, and give a stress to the sensor element. When the stress occurs in the sensor element, a stress is exerted on the resistive elements being formed on the sensor element, and the resistance value of the resistive varies. Also, the degree of the generated stress varies with time. In particular, in the case of the resistive element being formed of a semiconductor such as silicon, the piezoelectric resistance coefficient is large, and the resistance variation rate is large. The above resistance variation causes the deterioration of the measurement precision.

SUMMARY OF THE INVENTION

The present invention is to provide a thermal type flow sensor capable of reducing the thermal deterioration of the resistive element while maintaining the response of the sensor element, and maintaining the excellent measurement precision for a long period of time, or to provide a thermal type flow sensor capable of maintaining the measurement precision for a long period of time with a reduction in the influence of the stress that is applied to the sensor element.

The thermal type flow sensor according to the present invention solves the above problems by the following means.
(1) First, in order to reduce the characteristic fluctuation due to the deterioration of the heat resistive element, the following flow sensor of the thermal type resistive element is proposed.

The flow sensor includes plural heat resistive elements and a driver circuit for controlling a heating current to be applied to the heat resistive elements. The driver circuit is configured to sense a resistance change of a lower-temperature side heat resistive element among the plural heat resistive elements and to the heating current to be applied to the plural resistive elements in accordance with a sensed value of the lower-resistance's change.

The thermal type flow sensor makes the resistive element generate heat to measure the flow rate. The resistive element becomes larger in the resistance deterioration as the resistive element is heated at a higher temperature. It is not preferable to set the temperature of the heat resistive element to be low in order to reduce the deterioration because the sensitivity of the sensor is deteriorated.

On the contrary, the present invention senses the resistance change of the lower-side resistive element among the plural heat resistive elements and controls the current of the entire heat resistive elements. Therefore, it is possible to suppress the thermal deterioration of the relatively low heat resistive element for conducting the current control while the thermal value of the entire heat resistive elements is sufficiently ensured.

(2) Also, the thermal type flow sensor having the following configuration is proposed.

The flow sensor also includes plural heat resistive elements and a driver circuit for controlling a heating current to be applied to the heat resistive elements. The plural heat resistive elements are arranged in a flow passage of a fluid to be measured. The driver circuit is configured to sense a resistance change of an off-center heat resistive element in an arrangement of the plural heat resistive elements and to control the current to be applied to the plural heat resistive elements in accordance with a sensed value of the off-center resistance's change.

The plural heat resistive elements thus arranged have the temperature distribution in which the center position of the arrangement is at a higher temperature whereas the off-center thereof (outer side of the center) is at a lower temperature. Therefore, the resistance deterioration becomes larger toward the center portion of the heat resistive element arrangement. According to the configuration of the present invention, the resistance change (resistance change according to the flow rate) of the lower-temperature side heat resistive element being positioned at the outer side among the plural heat resistive elements is taken in as an electric signal. The current to be applied to the plural heat resistive elements is controlled on the basis of the electric signal to control the temperature of the lower-temperature side heat resistive elements. Alternatively, the same advantages are obtained even when using one heat resistive element for outputting the electric signal instead of the plural heat resistive element, by configuration in which the electric terminals is provided so as to output the electric signal from relatively low-temperature side portion positioned at outer side in the heat resistive element.

(3) The preferable resistive element circuit that is used in the thermal type flow sensor of the above items (1) and (2) will be proposed as follows.

The thermal type flow sensor includes a first series circuit with a first resistive element and a second resistive element, a second series circuit with a third resistive element and a fourth resistive element, a bridge circuit that connects the first series circuit and the second series circuit in parallel, and a fifth resistive element that is connected in parallel to or in series with the bridge circuit. Among them, any one of the first to fourth resistive elements, and the fifth resistive element are the heat resistive elements. Also, the thermal type flow sensor senses a change in the resistance of the heat resistive element in the bridge circuit, and controls the heat current flowing through the entire heat resistive element.

In more detail, the above first to fifth resistive elements are formed on a substrate made of semiconductor such as silicon. The substrate is partially removed to form a thin-walled portion. The first to fifth resistive elements may be made of any materials having the resistance temperature coefficient, and more specifically, can be made of, for example, semiconductor such as polycrystal silicon or single crystal silicon, or metal such as platinum. For example, the first resistive and fifth resistive elements are disposed on the thin-walled portion, and the second, the third, and the fourth resistive elements are disposed on the substrate outside the thin-walled portion. In addition, the first resistive element is disposed in the periphery of the fifth resistive element on the thin-walled portion. With the above configuration, when a current is supplied to the resistive elements, the first resistive element and the fifth resistive element since are formed on the thin-walled portion that is small in the thermal capacity, the temperature rising is higher than that of other resistive elements. Accordingly, the first resistive element and the fifth resistive element are mainly actuated as the heat resistive elements. Also, since the first resistive element is disposed in the periphery of the fifth resistive element, there is a tendency that the first resistive element is lower in the temperature than the fifth resistive element. In other words, there is a tendency that the area of the fifth resistive element that is positioned in the center is highest in the temperature among the heat resistive elements, and the heat resistive element area in the periphery of the area of the fifth resistive element is lower in the temperature since the heat is liable to be escaped more than that of the center. In addition, when the first resistive element sets the resistance so as to be lower in the thermal power than the fifth resistive element, it is possible to increase the temperature difference between the first resistive element and the fifth resistive element more. The second, the third, and the fourth resistive elements change in the resistance according to the temperature of the fluid to be measured. In the above configuration, the resistive element that is disposed on the thin-walled portion is not limited to the first resistive element and the fifth resistive element. The same configuration is obtained even if the second resistive element and the fifth resistive element are disposed on the thin-walled portion. In this case, the second resistive element and the fifth resistive element are mainly actuated as the heat resistive element, and the first, the third, and the fourth resistive elements mainly sense the temperature of the fluid to be measured.

Alternatively, in the above circuit, the first, the fourth, and the fifth resistive elements are disposed on the thin-walled portion of the sensor element. In this case, the first and the fourth resistive elements are disposed in the periphery of the fifth resistive element. In this case, the first, the fourth, and the fifth resistive elements are mainly actuated as the heat resistive element, and the second and the third resistive elements sense the temperature of the fluid to be sensed.

The resistive elements to be disposed on the thin-walled portion are not limited to the first, the fourth, and the fifth resistive elements, but the same configuration is obtained even if the second, the third, and the fifth resistive elements are disposed on the thin-walled portion. In this case, the second, the third, and the fifth resistant elements are mainly actuated as the heat resistive element, and the first and the fourth resistive elements mainly sense the temperature of the fluid to be detected.

(4) Further, in the above configuration, the resistive elements to be disposed outside the thin-walled portion on the sensor element, that is, plural resistive elements for sensing the temperature of the fluid to be measured in the bridge circuit are integrated together at substantially the same position on the sensor element to achieve the high precision.

(5) Still further, in the case of requiring the higher precision of the sensor, a sixth resistive element that is used for adjustment is disposed within the bridge circuit as follows. The thermal type flow sensor includes a first series circuit including the first resistive element, and the second resistive element and a second series circuit including the third resistive element, the sixth resistive element, and the fourth resistive element. And the bridge circuit is formed by connecting the first series circuit and the second series circuit in parallel. In addition, all of those resistive elements are made of the same material and formed on the sensor element, and electrically connected to each other on the sensor element.

(6) Subsequently, a description will be given of the configuration in which the characteristic variation is reduced in the case where a stress is applied to the sensor element.

The sensor element of the thermal type flow sensor has a resistive element made of metal or silicon formed on a semiconductor substrate. In particular, in the case where the resistive element is made of silicon (polycrystal silicon, single crystal silicon), the piezoelectric resistance coefficient of the resistive element is large, and when a stress is applied to the semiconductor substrate, the resistance of the resistive element is varied.

An example in which the stress is applied as described is proposed as follows.

An electric terminal pad that is made of, for example, aluminum is formed on the substrate of the sensor element. The electric terminal pad is wire-bonded by a gold wire to take out an electric output of the sensor element. Since the pad and the gold wire are liable to be subject to corrosion, and the strength is insufficient, the terminal pad and the gold wire are coated with a protective agent such as a resin. This causes a stress to be developed in the substrate of the sensor element due to the expansion and contraction of the protective agent. Also, the stress is developed in the sensor element through the protective agent due to the deformation of a member for mounting the sensor element.

In order to cope with the above problem, the resistive element and the electric terminal pad, which are formed on the substrate, are disposed at positions apart from each other on the substrate. Also, a thin-walled portion that reduces the transmission of the stress is formed between the resistive element and the electric terminal pad which are formed on the sensor element. Hereinafter, the specific embodiments of the above configuration will be described.

In a sensor element in which a resistive element and an electric terminal pad are formed on a square shaped substrate to measure the flow rate and output an electric signal of the resistive element outside the substrate, when the shorter side of the sensor element is W, and the longer side is L, the resistive element is formed at a position apart from the electric terminal pad by W/2 or longer. The resistive element described in the present specification defines a main portion of the resistor, and conductor routing for arranging the resistive element and a conductor for outputting an electric signal are not defined as the resistive element. Also, in the case where the bridge circuit is configured by the resistive elements, it is preferable that the resistive elements are connected to each other at a position apart from the electric terminal pad by W/2 or longer. Also, in the configuration where the thin-walled portion is formed on the substrate, and the resistive elements are formed on the thin-walled portion, it is preferable to form the thin-walled portion at a position apart from the electric terminal pad by W/2 or longer.

Alternatively, a recess portion (for example, a groove) formed by removing a part of a wall of the substrate is formed between an area in which the resistive element is formed on the substrate and the electric terminal pad.

(7) Further, the resistive element that is formed on the substrate is a combined resistance of a strip resistive element R1 in which a current flows through the longitudinal direction of the substrate (direction of "L"), and a strip resistive element Rw in which a current flows through a widthwise direction (direction of "W"), and the ratio of R1 and Rw is set as follows.

$$Rw:R1 = \Pi t:\Pi l$$

In the expression, $\Pi l$ and $\Pi t$ are piezoelectric resistance coefficients. $\Pi l$ is the resistance variation rate when the resistance is varied due to the stress that is applied in a direction parallel to the direction along which the current flows through the resistive element. $\Pi t$ is the resistance variation rate when the resistance is varied due to the stress that is applied in a direction perpendicular to the direction along which the current flows in the resistive element.

According to the above configuration, the thermal type flow sensor is capable of reducing at least one of the characteristic variation due to the deterioration of the heat resistive element due to the application of the stress, and of maintaining the measurement precision for a long period of time.

DETAILED DESCRIPTION OF THE INVENTION

A description will be given of a thermal type flow sensor according to embodiments of the present invention with reference to the drawings.

(First Embodiment)

Figure 1:
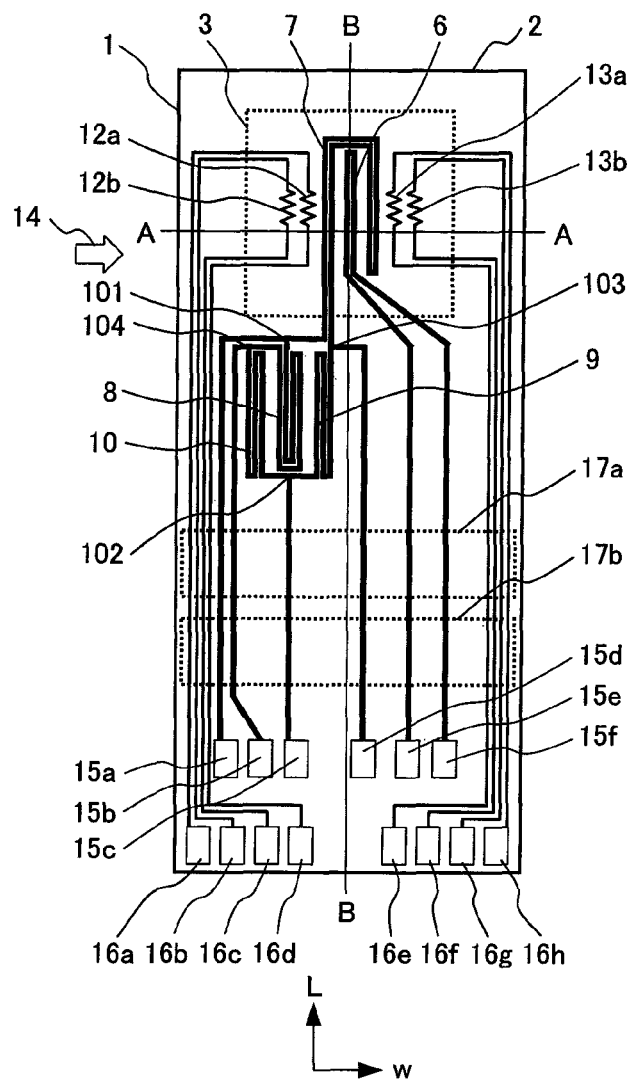
FIG. 1 is a plan view showing a sensor element according to a first embodiment.
Figure 2:
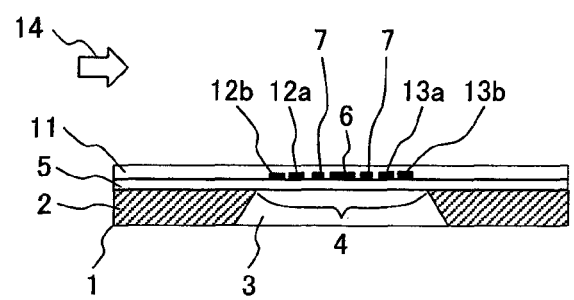
FIG. 2 is a cross-sectional view showing a sensor element according to to the first embodiment.
Figure 3:
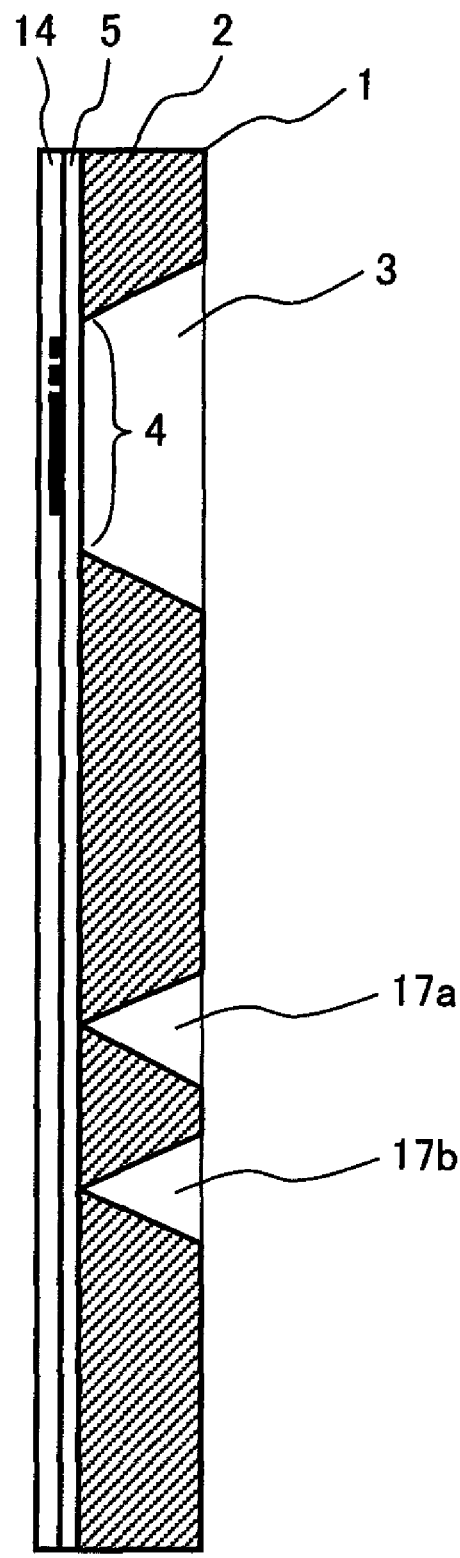
FIG. 3 is a cross-sectional view showing a sensor element according to the first embodiment.

FIG. 1 is a schematic plan view showing a sensor element of a thermal type flow sensor according to this embodiment. FIG. 2 is a schematic diagram taken along a section A-A in FIG. 1, and FIG. 3 is a schematic diagram taken along a section B-B. In those figures, a base of a sensor element 1 is formed of a semiconductor substrate 2 such as a single crystal silicon (Si) plate. The semiconductor substrate 2 has a cavity portion 3 as a recess portion formed by subjecting one surface of the semiconductor substrate 2 to anisotropic etching. The planar configuration of the cavity portion 3 is square. One surface of the cavity portion 3 is formed with a diaphragm (thin-walled portion) 4. The diaphragm 4 is formed of an electric insulating film 5 that covers one surface of the semiconductor substrate 2. The electric insulating film 5 is made of silicon dioxide ($SiO_2$) that is produced through thermal oxidation or a CVD (chemical vapor deposition) process.

Heat resistive elements 6, 7 and temperature sensitive resistive elements 12a, 12b, 13a, 13b are formed on the diaphragm 4. Temperature sensitive resistive elements 8, 9, and 10 are formed at places outside the diaphragm 4 on the substrate 2. All of those resistive elements are made of a material that changes the resistance according to the temperature, that is, a material having a temperature dependency. Among those heat resistive elements, as the heat resistive elements 6 and 7 are disposed on the diaphragm (thin-walled portion) 4, it is difficult to escape the heat generated by the heat resistive elements 6 and 7 to the external. Therefore, the heat resistive elements 6 and 7 are heated at a high temperature. Other resistive elements 8, 9, and 10 outside diaphragm are kept at a relatively low temperature because the generated heat is liable to be escaped through the substrate 2. The temperature sensitive resistive elements 8, 9, and 10 are sensitive to an air temperature. All of the resistive elements (heat resistive elements, temperature sensitive resistive elements) are made of, for example, polycrystal silicon. The polycrystal silicon is formed on the electric insulating film 5 through the CVD. The polycrystal silicon is etched to form a desired resistive element pattern.

Further, polysilicon is doped with phosphor (P) through the thermal diffusion or the ion implantation as n-type polycrystal silicon so as to obtain a desired resistance and resistance temperature coefficient. The resistive elements according to this embodiment are formed of polycrystal silicon, but can be formed of any materials having the resistance temperature coefficient. For example, the resistive element can be made of single crystal silicon, or metal such as platinum. In order to protect those resistive elements, an electric insulating film 11 is formed on the upper surfaces of the electric insulating film 5 and the resistive elements. The electric insulating film 11 is made of silicon dioxide ($SiO_2$) through the CVD method or the like. Aluminum terminals 15a to 15d and 16a to 16h for connecting the respective resistive elements to the driver circuit are formed on the substrate.

The heat resistive elements 6 and 7 are arranged side by side in the direction of airflow. The heat resistive element 6 is disposed in the center of the arrangement. The heat resistive element 7 is so patterned as to to surround the three orientations of the heat resistive element 6. In other words, the heat resistive element 7 is located at a position outside of the arrangement. In this embodiment, the resistance change of the heat resistive element 7 is sensed, and the current to be applied to the plural heat resistive elements 6 and 7 is controlled in accordance with the sensed value of the resistance change. A driver circuit for supplying the current will be described with reference to FIG. 4 later.

The temperature sensitive resistive elements 12a, 12b, and 13a, 13b are disposed at the two sides of the heat resistive elements 6 and 7, and the arrangement coincides with an airflow direction 14 of FIG. 1. The airflow direction 14 is a direction from an air intake of a suction pipe (not shown) of an engine toward the engine (not shown). In other words, the temperature sensitive resistive elements 12a and 12b are disposed immediately upstream from the heat resistive elements 6 and 7, and the temperature sensitive resistive elements 13a and 13b are disposed immediately downstream from the heat resistive elements.

Recess portions, for example, grooves 17a and 17b are formed on a rear surface of the semiconductor substrate 2. Those grooves are arranged side-by-side between the formation area of the resistive elements (6-10, 12a, 12, 13a, 13b) and the formation area of the electric terminals (15a-15f, 16a-16h). The grooves 17a and 17b are defined by anisotropic etching as with the cavity 3.

Figure 4A:
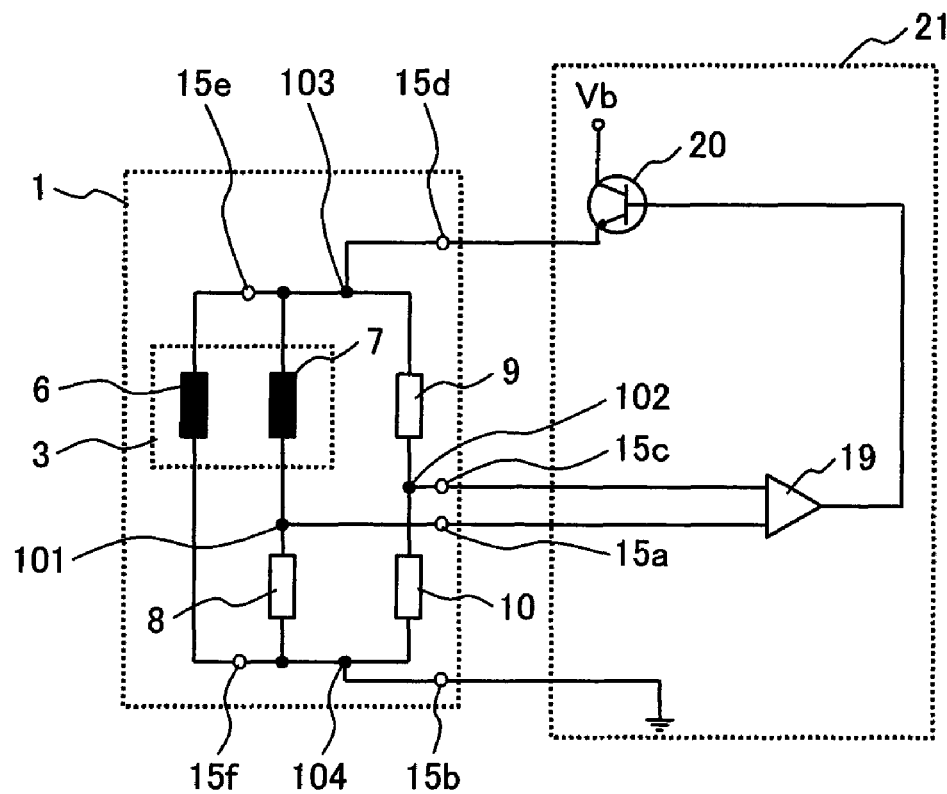
FIG. 4 is a driver circuit of the sensor element according to the first embodiment.

FIG. 4(a) shows a driver circuit 21 for driving the sensor element 1. The heat resistive element 7 and the temperature sensitive resistive elements 8, 9, 10 constitute the bridge circuit. The bridge circuit is formed by connecting a first arm (first serial circuit) with the heat resistive element 7 (first resistive element) and the temperature sensitive resistive element 8 (second resistive element) and a second arm (second serial circuit) with the temperature sensitive resistive element 9 (third resistive element) and the temperature sensitive resistive element 10 (fourth resistive element) in parallel. The heat resistive element 6 (fifth resistive element) is connected in parallel to the bridge circuit. An intermediate voltage between the heat resistive element 7 and the temperature sensitive resistive element 8 and an intermediate voltage between the temperature sensitive resistive element 9 and the temperature sensitive resistive element 10 are inputted to a differential amplifier circuit 19.

The differential amplifier circuit 19 carries out a feedback control on a current (in particular, a heating current flowing through the heat resistive element 7) which flows through the bridge circuit via a transistor 20 so that the intermediate voltage difference of the bridge circuit becomes zero. In this case, the heat resistive element 6 is applied with a current in accordance with to the resistive ratio to the bridge circuit under control. Therefore, the heating current for obtaining the sufficient heating value is supplied to the entire heat resistive element (the heat resistive element 6 and the heat resistive element 7) through the transistor 20.

The heat resistive elements 6 and 7 rise in the temperature due to the heating current, and change in the resistance in accordance with the temperature. The temperature of the heating resistive element 7 which changes in accordance with the air flow rate is sensed by the bridge circuit, and the temperature difference between the heat resistive element 7 and the temperature sensitive resistive elements 8 and 9 are controlled so as to be a constant temperature $\Delta T$.

It is defined that the resistance of the heat resistive element 7 is R7, the resistance of the temperature sensitive resistive element 8 is R8, the resistance of the temperature sensitive resistive element 9 is R9, and the resistance of the temperature sensitive resistive element 10 is R10. Here, R7, R8, R9, and R10 are resistances when no current is applied (heated). With the above operation, the temperature of the heat resistive element 7 is determined as the following expression.

[EX. 1]

$$\Delta T = \frac{\left(\frac{R_8}{R_7}\frac{R_9}{R_{10}} - 1\right)}{\alpha} \quad (1)$$

In the above expression, ΔT is a temperature difference between the heat resistive element 7 and the temperature sensitive resistive elements 8, 9, and 10. The temperature sensitive resistive elements 8, 9, and 10 sense the temperature of the fluid to be measured. Therefore, Expression (1) expresses that the temperature of the heat resistive element 70 is higher than the temperature of the fluid to be measured by ΔT (° C.). a of Expression (1) is the resistance temperature coefficient of the heat resistive element 7, and represents the resistance temperature coefficient of polycrystal silicon in this embodiment.

Figure 5:
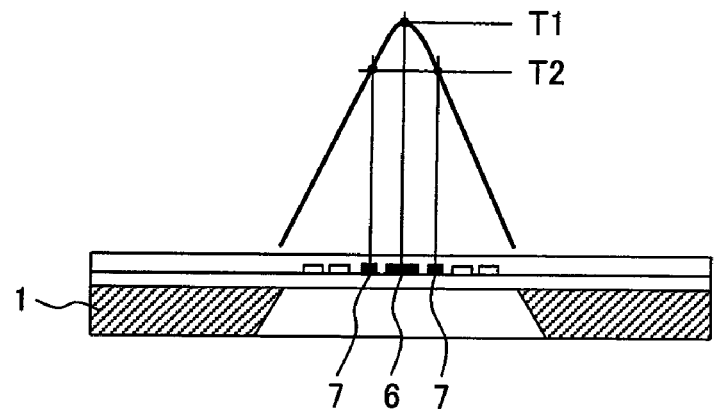
FIG. 5 is a temperature distribution of the sensor element according to the first embodiment.

FIG. 5 shows a temperature distribution of the diaphragm 3 when the heat resistive element 6 and the heat resistive element 7 are supplied with a current so as to be heated. Since the heat resistive element 7 is disposed in the periphery of the heat resistive element 6, the temperature T2 of the heat resistive element 7 is lower than the temperature T1 of the heat resistive element 6. In this embodiment, the resistance change of the heat resistive element 7 is sensed by the bridge circuit. Since the temperature of the heat resistive element 7 is relatively low, the resistance deterioration thereof is small, and the variation of the resistance ratio (R8/R7) of the bridge circuit is reduced. As a result, the heat resistive element 6 is high in the temperature, and the resistance deterioration is large, but the resistance ratio of the bridge circuit is not affected. Therefore, it is possible to maintain the constant heat temperature constant for a long period of time.

Further, when the resistance value of the heat resistive element 6 is set so that the power consumption (heat capacity) is larger than that of the heat resistive element 7, the temperature difference between the heat resistive element 6 and the heat resistive element 7 becomes large with the more advantage.

Additionally, since the heat current that flows through the heat resistive element 7 is directly sensed to control the temperature of the heat resistive element, the temperature rising time at the time of start is shortened, and the response speed is higher than that of the system disclosed in the above-described JP-A 2004-340936. Furthermore, since the reference power supply is not used for the driver circuit, such a problem that an error occurs due to the voltage change of the reference power supply can be avoided.

The temperature sensitive resistive elements 12a, 12b and 13a, 13b sense the temperature difference between both sides (upstream, downstream) of the heat resistive elements 6 and 7 in the airflow direction 14, and output an electric signal corresponding to the flow rate of the fluid to be measured. When a fluid flows, the temperature sensitive resistive elements 13a and 13b downstream from the heat resistive element is higher in the temperature than the temperature sensitive resistive elements 12a and 12b upstream thereof due to the thermal influence of the heat resistive elements 6 and 7, and the temperature difference becomes larger as the flow rate is increased more. The above operation is applied in the case of the forward flow, but in the case of the reversed flow, the temperature sensitive resistive elements 13a, 13b are at the upstream side, and the temperature sensitive resistive elements 12a and 12b are at the downstream side, and the temperature difference is reversed as compared with the case of the forward flow. In this embodiment, the flow rate is sensed by using the phenomenon.

FIG. 1 shows a plan configuration of the temperature sensitive resistive elements 12a, 12b, and 13a, 13b.

The temperature sensitive resistive elements 13a and 13b are identical in form and size with the temperature sensitive resistive elements 12a and 12b, and both of them (13a, 13b and 12a, 12b) are symmetrically disposed around the heat resistive elements 6 and 7.

Figure 4B:
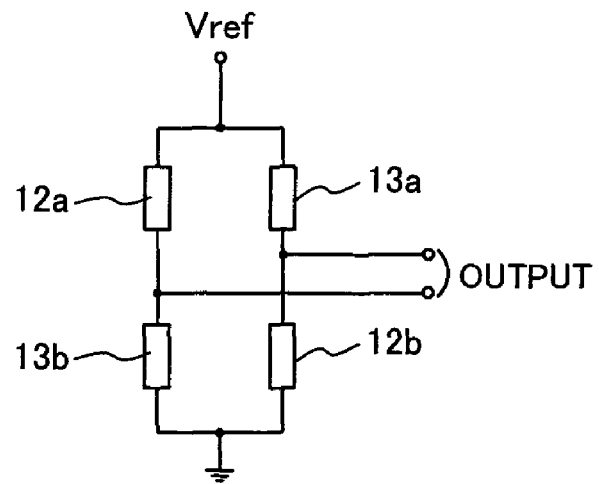

FIG. 4(b) shows the driver circuit of the temperature sensitive resistive elements 12a, 12b and 13a, 13b.

For example, when the fluid to be measured flows on the sensor element 1 in a direction indicated by an arrow 14, the temperature sensitive resistive elements 12a and 12b decreases in the temperature and decreases in the resistance. On the contrary, the temperature sensitive resistive elements 13a and 13b rise in the temperature, and increases in the resistance. The circuit shown in FIG. 4(b) configures the bridge circuit by the temperature sensitive resistive elements 12a, 12b, 13a, and 13b. A reference voltage Vref is applied to the bridge circuit to obtain a differential output from the resistance change in accordance with the fluid to be measured. The differential output becomes a flow rate sensing signal.

According to this embodiment, since the temperature sensitive resistive elements 12a, 12b and 13a, 13b are sensitive to the heat generated by the heat resistive elements 6 and 7, it is possible to excellently maintain the sensor sensitivity. Moreover, since the current control of the heat resistive elements 6 and 7 is executed by the aid of the lower-temperature side heat resistive element 7 (smaller in the heat deterioration), it is possible to reduce the performance deterioration in the heater control of the sensor as well as the measurement.

Figure 6:
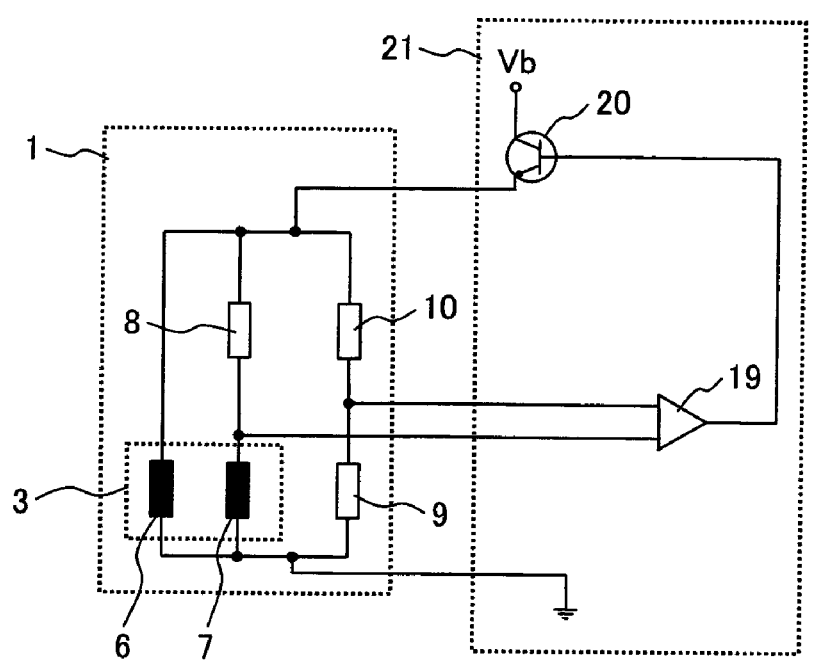
FIG. 6 is a driver circuit of the sensor element according to the first embodiment.

The driver circuit of the heat resistive element according to this embodiment can be structured, as shown in FIG. 6, so that the positions of the heat resistive element 7 and the temperature sensitive resistive element 8 in the bridge circuit, and the positions of the temperature sensitive resistive element 9 and the temperature sensitive resistive element 10 are reversed with respect to the embodiment shown in FIG. 1.

In this embodiment, all of the heat resistive element 7, the temperature sensitive resistive elements 8, 9, 10, and other temperature sensitive resistive elements are made of polycrystal silicon on the semiconductor substrate 2. The heat resistive element 7 and the temperature sensitive resistive element 8 are identical in the line width with each other, and also identical in the turning angles and the number of turnings with each other. Likewise, the temperature sensitive resistive element 9 and the temperature sensitive resistive element 10 are made of the same material, and are equal to each other in the line width as well as the angle and number of turnings. Since those elements are made of the same material, even if the manufacturing variation occurs in the resistance of the material, the resistance ratio of the bridge circuit is not varied. Also, the line width and the number of turnings are set to be identical with each other. With the above configuration, even if the line width of the resistive element is made smaller by over-etching, since those resistive elements are over-etched in substantially the same manner to provide the same line width, the variation of the resistance ratio is small.

Figure 7:
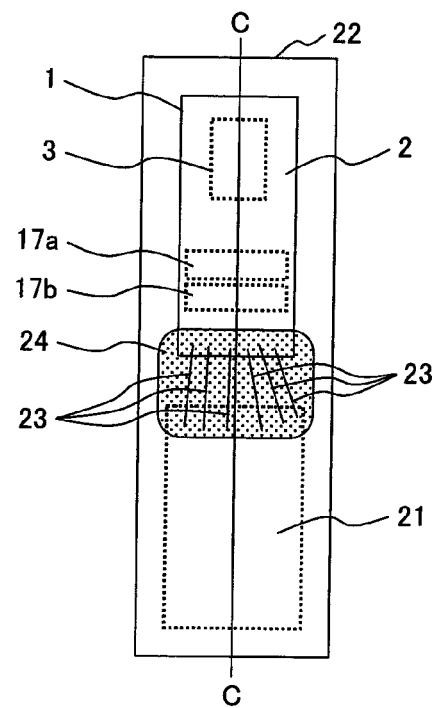
FIG. 7 is a plan view showing the mounting formation of the sensor element according to the first embodiment.

FIG. 7 shows an embodiment in the case where the sensor element 1 (for example semiconductor substrate 2: a first substrate) is mounted on a base plate 22 as a second substrate. The above-described sensor element 1 and a driver circuit 21 for driving the sensor element 1 are mounted on the base plate 22. In FIG. 7, the details of the sensor element 1 and the driver circuit 21 will be omitted. In order to electrically connect the sensor element 1 and the driver circuit 21 to each other, the aluminum terminals 15a to 15d and 16a to 16h (refer to FIG. 1) which are formed on the sensor element 1 and the electric terminals of the driver circuit 21 are subjected to wire bonding 23 by the aid of gold wires. Also, the wire bonding 23 is protectively coated with a sealant 24 such as epoxy.

Figure 8:
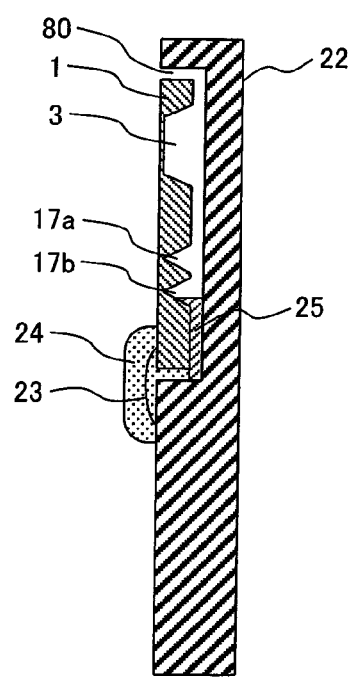
FIG. 8 is a cross-sectional view showing the mounting formation of the sensor element according to the first embodiment.

FIG. 8 shows a section C-C in FIG. 7. The base plate 22 is provided with a recess portion 80 for locating the sensor element 1. The sensor element 1 is adhered to the base plate 22 with an adhesive 25 such as a silicone adhesive. The adhesive 25 is partially coated with the sensor element 1, and the sensor element 1 is cantilevered. The sealant 24 is coated so as to cover over the wire bonding 23.

With the usage of the thermal type flow sensor, the contact portions between the aluminum terminals 15a to 15d, 16a to 16h and their wires for wire bonding 23 are deteriorated, and the contact resistance may be increased. In this embodiment, the bridge circuit made up of the heat resistive element 7 and the temperature sensitive resistive elements 8, 9, 10 has a connection thereof on the semiconductor substrate of the measurement element 1 (refer to connecting portions 101 to 104 in FIGS. 1 and 4(a)), and a contact resistance of the wire bonding does not be included in the bridge circuit. Therefore, even if the wire bonding is deteriorated, and the contact resistance is increased, the bridge balance is not changed at all. Even in the above connection configuration, since the flow sensor maintains the bridge balance in the excellent state for a long period of time, it is possible to maintain the excellent constant temperature control of the heat resistive element for a long period of time.

In the mounting structure of the sensor element 1 as described above, a stress is generated in the sensor element 1 due to the thermal expansion and the thermal contraction of the adhesive 25 or the sealant 24. In the case where there is no attention on the above stress, the resistance of the temperature sensitive element (including the heat resistive element) being formed on the sensor element 1 may be varied. The grooves 17a and 17b formed on the back surface of the sensor element 1 have a function of relieving the above stress.

The grooves 17a and 17b has a function of preventing an outflow of the adhesive 25 as shown in FIG. 8, and the adhesive 25 does not outflow beyond the groove 17b. Also, it is possible to coat the adhesive 25 on the back surface of the sensor element 1 in a stable configuration. In addition, the grooves 17a and 17b relieve the stress generated from the sealant 24 or the adhesive 25, and reduce the stress that is transferred to the resistive element on the sensor element 1. In this embodiment, two grooves of the grooves 17a and 17b are exemplified, but the number of grooves can be set to one, or two or more grooves can be defined.

The formation of the grooves 17a and 17b makes it possible to reduce the stress, particularly, in the longitudinal direction of the sensor element 1 (vertical direction in FIG. 1). The stress in the widthwise direction (horizontal direction in FIG. 1) of the sensor element 1 is solved by configuring the temperature sensitive resistive elements formed on the sensor element 1 as follows.

Figure 9:
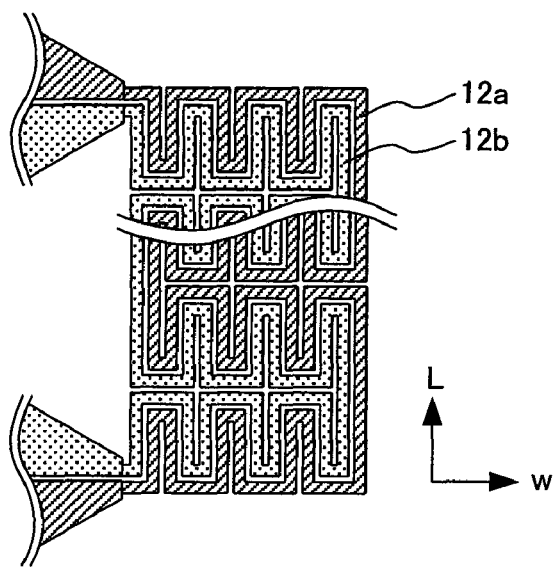
FIG. 9 is a plan view showing the configuration of a temperature sensitive resistive element according to the first embodiment.

The planar configuration of the temperature sensitive resistive elements 12a and 12b according to this embodiment is shown in FIG. 9. The planar configuration of the temperature sensitive resistive elements 13a and 13b are identical in the configuration with the temperature sensitive resistive elements 12a and 12b, and will be omitted from FIG. 9. Those elements 12a, 12b and 13a, 13b are symmetrical centering on the heat resistive elements 6 and 7.

The configuration of the temperature sensitive resistive elements 12a and 12b has a combined resistance of a strip resistive element (R1) in which a current flows in the L direction in the FIG. 9 and a strip resistive element (Rw) in which a current flows in the W direction in the figure. The resistances of R1 and Rw are expressed as follows.

$$Rw:R1 = |\Pi t|:|\Pi 1|$$

In this expression, $\Pi 1$ and $\Pi t$ are piezoelectric resistance coefficients. $\Pi 1$ is a resistance variation rate when the resistance is varied according to the stress applied in a direction parallel to the direction along which the current flows in the resistive element. $\Pi t$ is the resistance variation rate when the resistance is varied according to the stress applied in a direction perpendicular to the direction along which the current flows in the resistive element. For example, in the case where the resistive element is made of n-type polycrystal silicon, a relationship between $\Pi 1$ and $\Pi t$ is expressed as follows.

$$\Pi 1:\Pi t = -3:1$$

Therefore, the configuration that satisfies the following expression is given.

$$Rw:R1 = 1:3$$

In the case where a stress $s_w$ in the W direction is applied to the resistive element configured as described above, the resistance variation $\Delta R1$ of R1 and the resistance variation $\Delta Rw$ of Rw are expressed as follows.

[EX. 2]

$$\Delta R_1 = \pi_t R_l \sigma_w \tag{2}$$

$$\Delta R_w = \pi_l R_w \sigma_w = -3\pi_t \frac{1}{3} R_l \sigma_w = -\pi_t R_l \sigma_w$$

Accordingly, the resistance variation of the temperature sensitive resistive element 12a becomes $\Delta R_w + \Delta R_1 = 0$, and there occurs no resistance change due to the stress $s_w$.

As described above, the stress in the longitudinal direction of the sensor element 1 is reduced by the grooves formed on the back surface of the sensor element, and the stress influence in the widthwise direction of the sensor element 1 can be reduced by the resistive element or other configurations of the sensor element.

In this embodiment, the aluminum terminal on the sensor element 1 is subjected to the wire bonding, to thereby electrically connect the resistive element and the driver circuit to each other on the sensor element 1.

Figure 10:
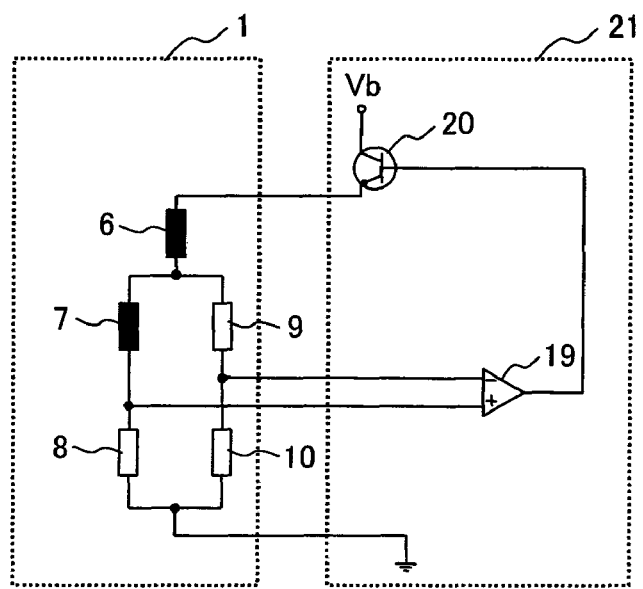
FIG. 10 is a driver circuit of the sensor element according to the first embodiment.

In this embodiment, as shown in FIGS. 4 and 6, the heat resistive element 6 is connected in parallel to the bridge circuit. Alternatively, as shown in FIG. 10, the circuit configuration can be made so that the heat resistive element 6 is connected in series between the bridge circuit and the transistor 20. Also, as shown in FIG. 11, the circuit configuration can be made so that the heat resistive element 6 is connected between the bridge circuit and the ground.

Figure 11:
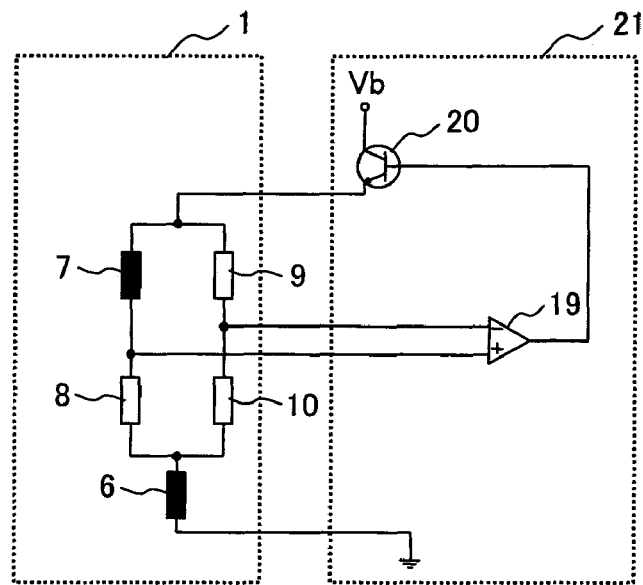
FIG. 11 is a driver circuit of the sensor element according to the first embodiment.

In other words, the heat resistive element driver circuit according to the embodiment shown in FIGS. 10 and 11 comprises the first series circuit including the first resistive element 7 and the second resistive element 8, the second series circuit including the third resistive element 9 and the fourth resistive element 10, the bridge circuit formed by connecting the first series circuit and the second series circuit in parallel to each other, and the fifth resistive element 7 being connected in series with the bridge circuit.

(Second Embodiment)

Figure 26:
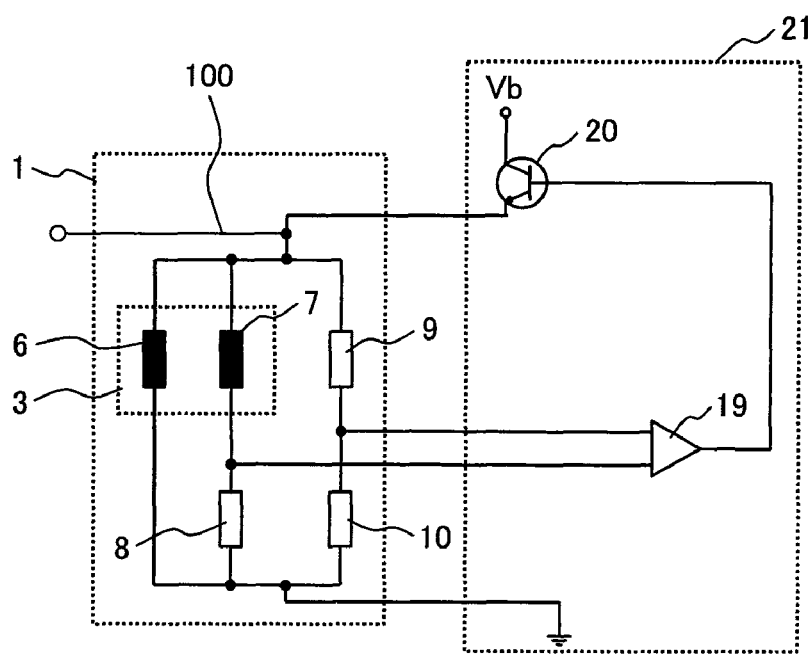
FIG. 26 is a driver circuit of the sensor element according to a second embodiment.

In the above embodiment, the temperature difference between the upstream and the downstream from the heat resistive elements (the temperature difference are formed by the heat resistive elements 6 and 7) is sensed by the temperature sensitive resistive elements 12a, 12b and 13a, 13b, to thereby sense the flow rate. Instead, it is possible to convert the current change that flows through the heat resistive element into an electric signal to sense the flow rate. For example, as shown in FIG. 26, the configuration of the sensor element can be proposed as follows. Namely, the sensor element is configured to sense the heating current for heat resistive elements at precedence position to the heat resistive elements 6 and 7 (the precedence position is located between the transistor 20 and the heat resistive elements 6, 7) and to convert the sensed current into a voltage to obtain an output 100. Thereby, the configuration makes it possible to sense the flow rate. Since the circuit shown in FIG. 26 is identical in the configuration with the driver circuit shown in FIG. 4(*a*) except for the output 100, the other description will be omitted.

(Third Embodiment)

Figure 12:
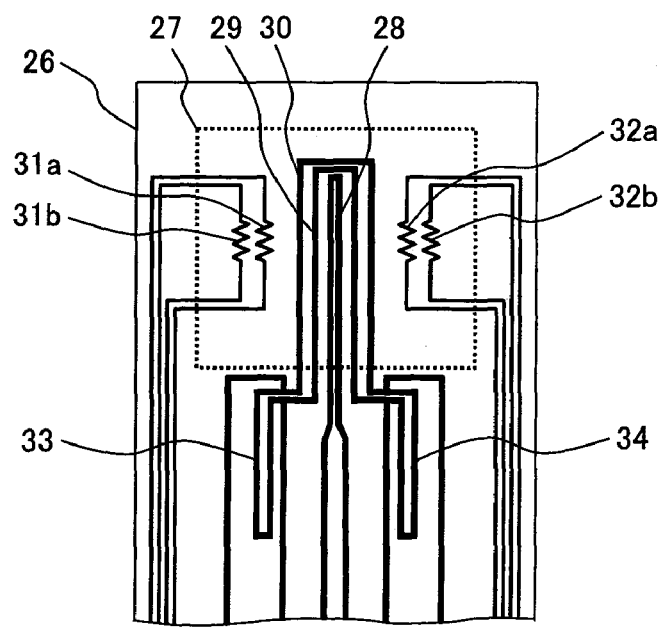
FIG. 12 is a plan view showing a sensor element according to a third embodiment.

FIG. 12 shows a plan view of a sensor element 26 according to this embodiment. A method of manufacturing the sensor element 26 is same as that of the first embodiment. The sensor element 26 is provided with a diaphragm (thin-walled portion) 27 as well as the first embodiment. Heat resistive elements 28, 29, 30, and temperature sensitive resistive elements 31a, 31b, 32a, and 32b are formed on the area of the diaphragm 27. Temperature sensitive resistive elements 33 and 34 are formed on places outside the diaphragm 27. As described above, the heat resistive element 29 corresponds to the first resistive element, the heat resistive element 30 corresponds to the fourth resistive element, and the heat resistive element 28 corresponds to the fifth resistive element.

Figure 13:
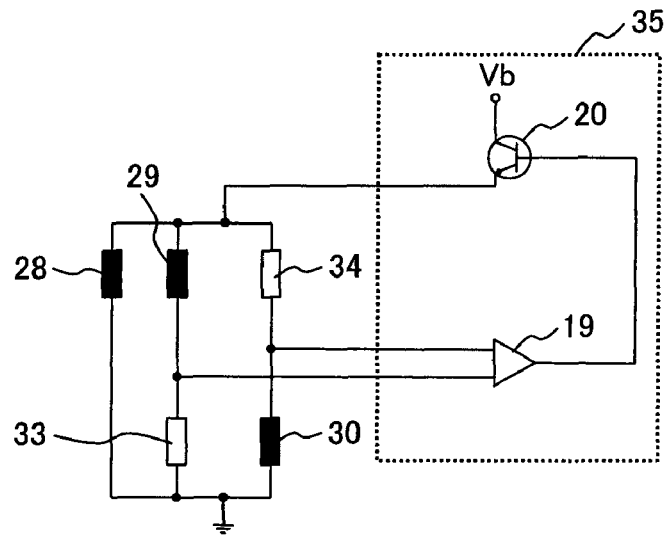
FIG. 13 is a driver circuit of the sensor element according to the third embodiment.

FIG. 13 shows a driver circuit 35 of the sensor element 26. The bridge circuit is configured by connecting a first series circuit with a heat resistive element 29 (first resistive element) and a temperature sensitive resistive element 33 (second resistive element) and a second series circuit with a temperature sensitive resistive element 34 (third resistive element) and a heat resistive element 30 (fourth resistive element) in parallel to each other. Also, a heat resistive element 28 (fifth resistive element) is connected in parallel to the bridge circuit. A difference voltage of the bridge circuit is inputted to the differential amplifier 19. An output of the differential amplifier 19 becomes the base voltage of the transistor 20, and the heat current flowing through bridge circuit is subjected to feedback control as in the above-mentioned embodiments.

In this embodiment, the heat resistive element 29 (first resistive element) and the heat resistive element 30 (fourth resistive element) are incorporated into the bridge circuit, and the temperatures of them are substantially identical with each other. The heat resistive element 28 (fifth resistive element) sets the resistance so that the power consumption (heat value) is larger than that of the heat resistive elements 29 and 30. As a result, since the heating temperature of the heat resistive elements 29 and 30 can be relatively decreased, the resistance deterioration of the heat resistive elements 29 and 30 becomes small. Since the temperature control of the heat resistive elements is performed by sensing the electric signal of the heat resistive elements 29 and 30 which are small in the resistance deterioration as well as the first embodiment, the heat temperature can be maintained constant for a long period of time.

In addition, since this embodiment controls the heat resistive elements according to two temperature information on the heat resistive element 29 and the heat resistive element 30, it is possible to perform the constant temperature control with the high sensing sensitivity and the high precision. Also, as shown in FIG. 14, a circuit configuration can be made so that an emitter of the transistor 20 is connected to a connecting point between the temperature sensitive resistive element 33 and the heat resistive element 30 of the bridge circuit, and the ground (GND) is connected to a connecting point between the heat resistive element 29 and the temperature sensitive resistive element 34.

In the first embodiment, as the heating current flows through the three temperature sensitive resistive elements other than the heat resistive element, the power loss may become relatively large by the number of the temperature sensitive elements. In this embodiment, because the number of temperature sensitive resistive elements is two, the power loss is reduced to ⅔.

Figure 14:
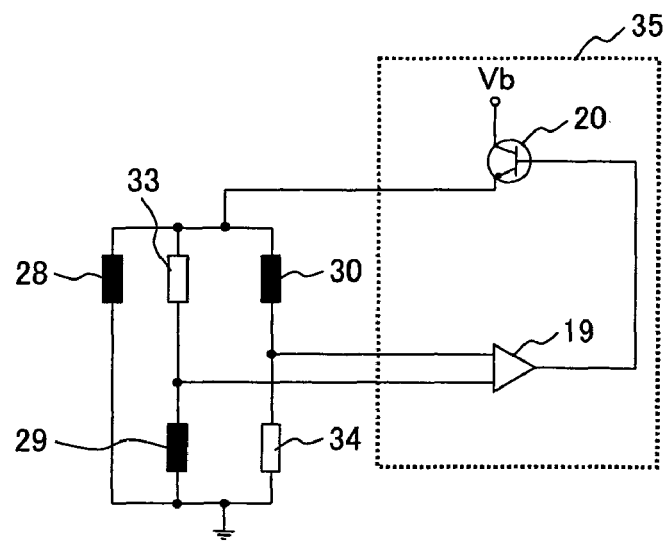
FIG. 14 is a driver circuit of the sensor element according to the third embodiment.
Figure 15:
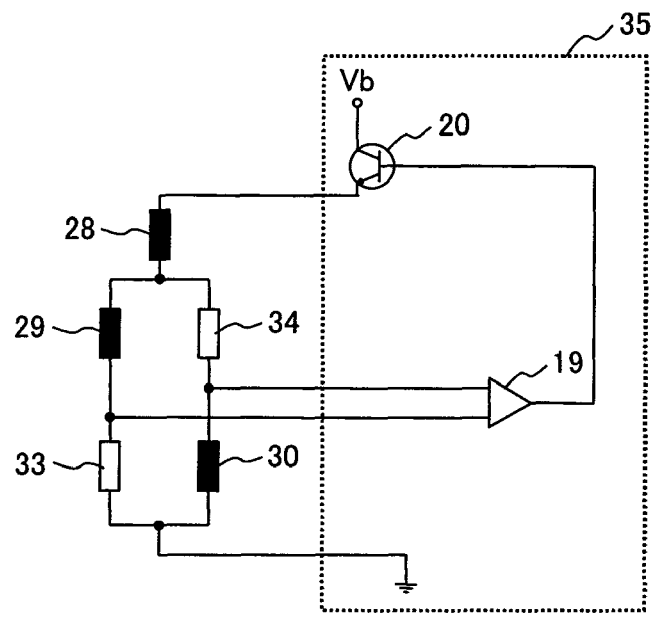
FIG. 15 is a driver circuit of the sensor element according to the third embodiment.
Figure 16:
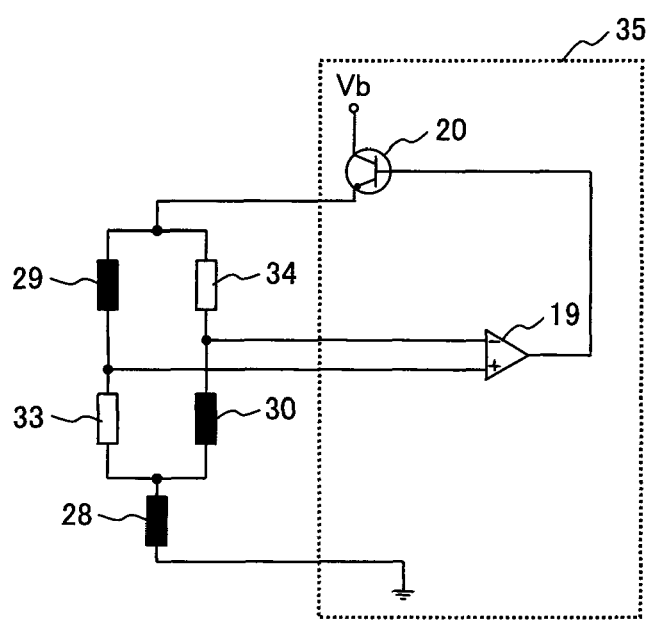
FIG. 16 is a driver circuit of the sensor element according to the third embodiment.

In this embodiment, the heat resistive element 28 (fifth resistive element) is connected in parallel to the bridge circuit as shown in FIGS. 13 and 14. Alternatively, as shown in FIG. 15, a circuit configuration can be made so that the heat resistive element 28 is connected in serial between the bridge circuit and the transistor 20. Also, as shown in FIG. 16, a circuit configuration can be made so that the heat resistive element 28 is connected to a connecting point between the bridge circuit and the ground.

(Fourth Embodiment)

Figure 17:
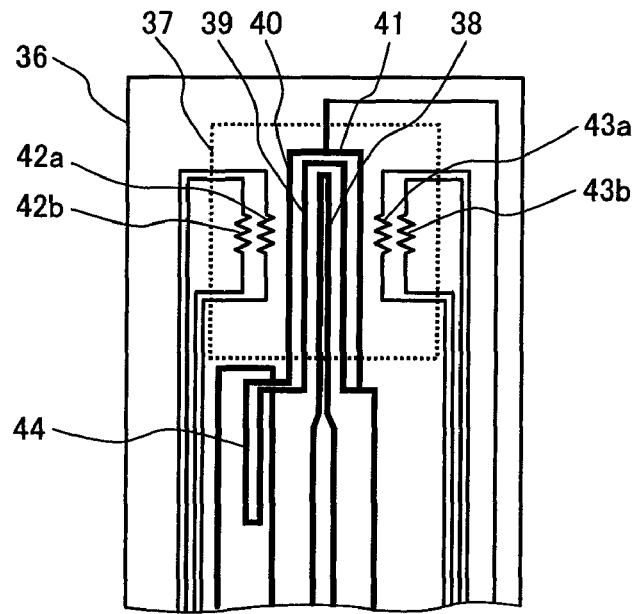
FIG. 17 is a plan view showing a sensor element according to a fourth embodiment.

FIG. 17 shows a plan view of a sensor element 36 according to this embodiment. A method of manufacturing the sensor element 36 is same as that in the first embodiment. Also, the sensor element 36 is provided with a diaphragm 37 as well as in the first embodiment. Heat resistive elements 38, 39, 40, and 41, and temperature sensitive resistive elements 42a, 42b, 43a, and 43b are formed on the area of the diaphragm 37. A temperature sensitive resistive element 44 is formed at a place out of the diaphragm 37.

Figure 18:
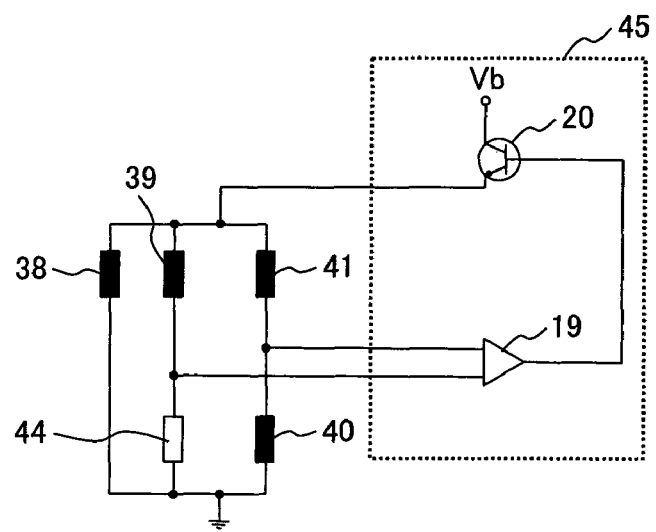
FIG. 18 is a driver circuit of the sensor element according to the fourth embodiment.

FIG. 18 shows a driver circuit 45 of the sensor element 36. The bridge circuit is configured by connecting a first series circuit with a heat resistive element (first resistive element) 39 and a temperature sensitive resistive element (second resistive element) 44 and a second series circuit with a heat resistive element 41 (second resistive element) and a heat resistive element (second resistive element) 40 in parallel to each other. Also, a heat resistive element 38 (fifth resistive element) is connected in parallel to the bridge circuit. A difference voltage of the bridge circuit is inputted to the differential amplifier 19. An output of the differential amplifier 19 becomes the base voltage of the transistor 20, and the heat current to be fed back to the bridge circuit is controlled.

In this embodiment, the temperatures of the heat resistive element 40 and the heat resistive element 41 are substantially identical with each other. Therefore, the temperature of the heat resistive element is controlled on the basis of the resistance change of the heat resistive element 39 of the bridge circuit. The resistance of the heat resistive element 38 is set so that the power consumption is larger than that of the heat resistive elements 39, 40, and 41. As a result, because the heat temperature of the heat resistive elements 39, 40, and 41 can be relatively decreased, the resistance deterioration of the heat resistive elements 39, 40, and 41 becomes small. Therefore, since the heat temperature is controlled by sensing the electric signals of the heat resistive elements 39, 40, and 41 which are small in the resistance deterioration, the heat temperature can be maintained constant for a long period of time.

Figure 19:
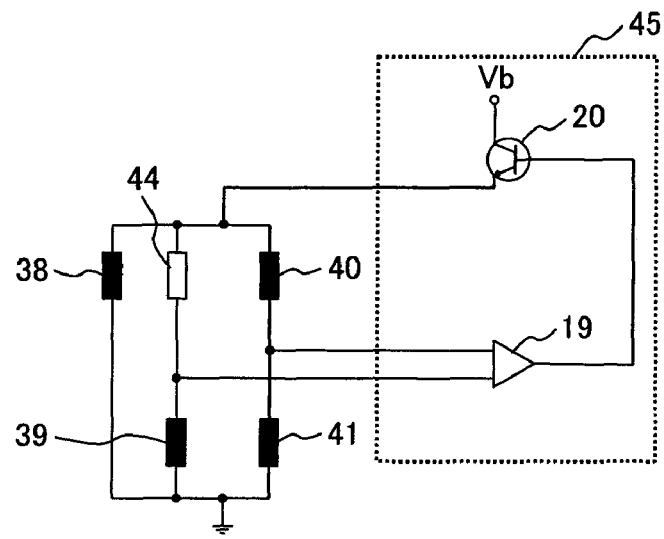
FIG. 19 is a driver circuit of the sensor element according to the fourth embodiment.

Alternatively, as shown in FIG. 19, a circuit configuration can be made so that the emitter of the transistor 20 is connected between the bridge resistive element 44 and the heat resistive element 40, and the ground is connected to a connecting point between the heat resistive element 39 and the heat resistive element 41.

In the first embodiment, as the heat current flows through the three temperature sensitive resistive elements, the power loss is caused. In this embodiment, because the number of temperature sensitive resistive elements is one, the power loss is reduced to ⅓ with the result that the power consumption is further lower than that in the second embodiment.

Figure 20:
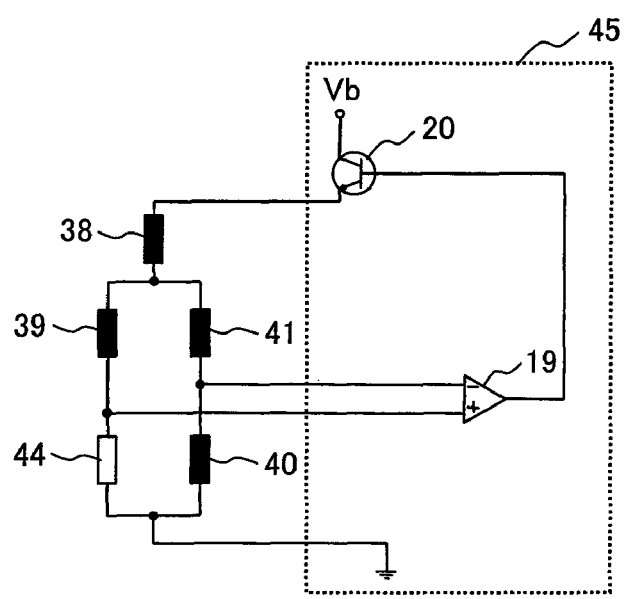
FIG. 20 is a driver circuit of the sensor element according to the fourth embodiment.
Figure 21:
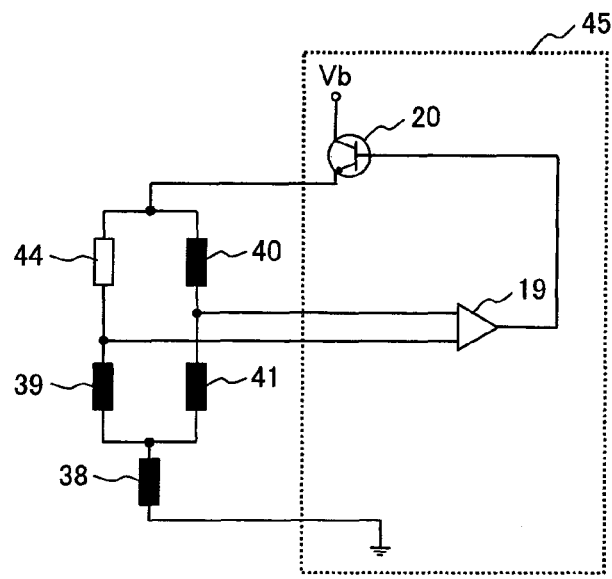
FIG. 21 is a driver circuit of the sensor element according to the fourth embodiment.

In this embodiment, the heat resistive element 28 is connected in parallel to the bridge circuit as shown in FIGS. 18 and 19. Alternatively, as shown in FIG. 20, a circuit configuration can be made so that the heat resistive element 38 is connected in serial between the bridge circuit and the transistor 20. Also, as shown in FIG. 21, a circuit configuration can be made so that the heat resistive element 38 is connected to a connecting point between the bridge circuit and the ground.

(Fifth Embodiment)

Figure 22:
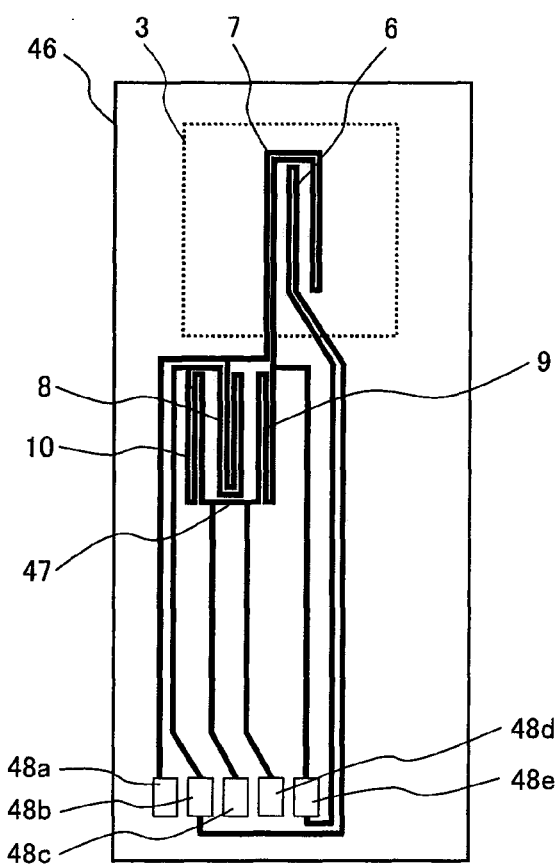
FIG. 22 is a plan view showing a sensor element according to a fifth embodiment.

FIG. 22 shows a plan view of a sensor element 46 according to this embodiment. In this embodiment, an adjustment resistor 47 is formed in the measurement element 1 that is the same as that in the first embodiment. The adjustment resistor 47 is formed between the resistive element 9 and the temperature sensitive resistive element 10 of the bridge circuit. Also, the adjustment resistor 47 is made of the same polycrystal silicon as that of the heat resistive elements 6, 7 and the temperature sensitive resistive elements 8, 9, and 10. Aluminum terminals 48c and 48d that take out an electric signal at both ends of the adjustment resistor 46 are formed on the substrate. The other configuration is the same as that of the sensor element 1 in the first embodiment.

Figure 23:
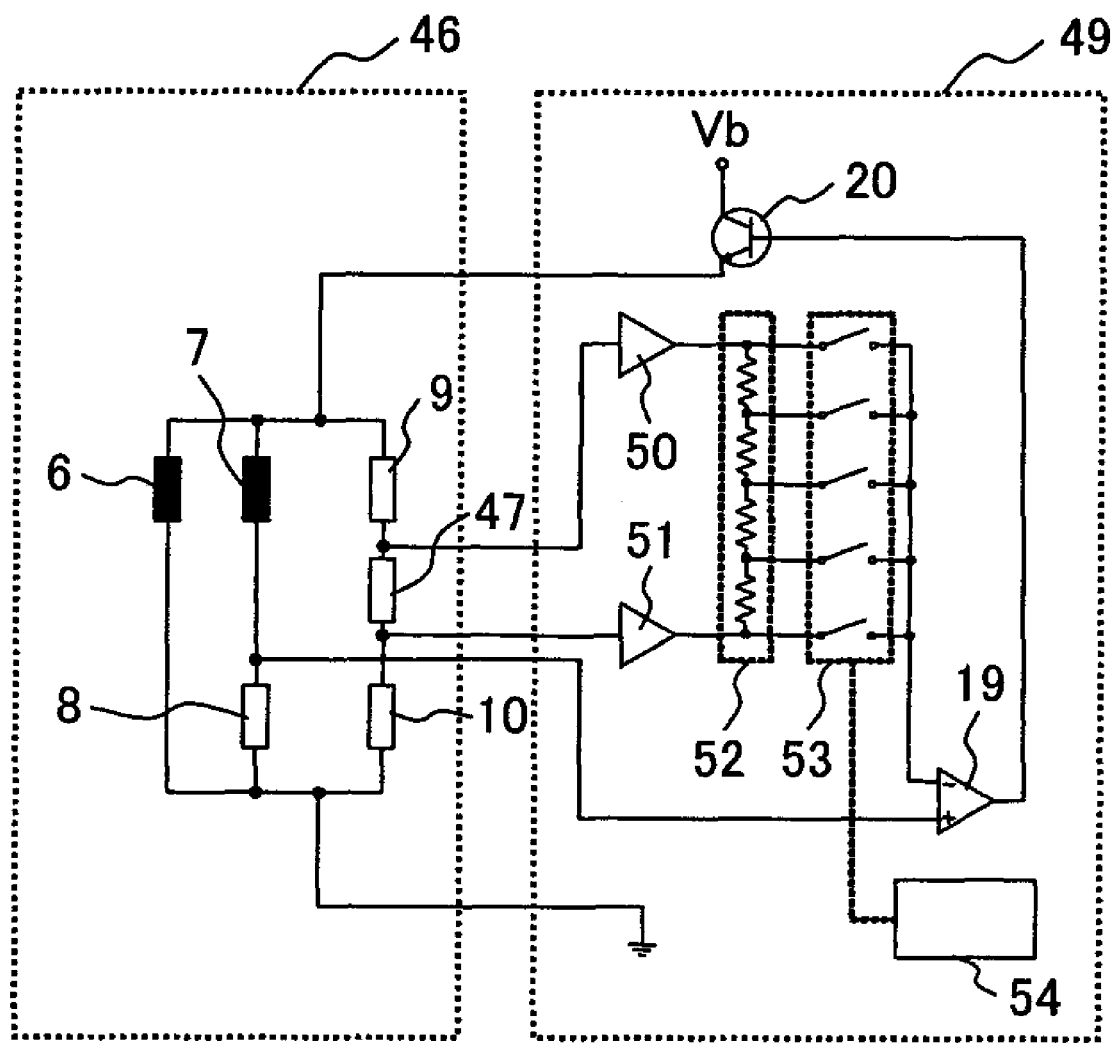
FIG. 23 is a driver circuit of the sensor element according to the fifth embodiment.

FIG. 23 shows a driver circuit 49 of the sensor element 46. A series circuit comprising the heat resistive element 7 and the temperature sensitive resistive element 8 is connected in parallel to a series circuit comprising the temperature sensitive resistive element 9, the adjustment resistor 47, and the temperature sensitive resistive element 10 to form a bridge circuit. The heat resistive element 6 is connected in parallel to the bridge circuit.

The driver circuit 49 is made up of buffers 50, 51, a multi-step series resistor 52, a switch 53, a differential amplifier circuit 19, a transistor 20, and a switch control circuit 54.

Buffers 50 and 51 sense the voltage across the adjustment resistive element 47 while eliminating an influence of the wiring resistance. The switch 53 variably adjusts the voltage divided ratio of the multi-stage series resistor 52, and is made up of plural switching elements. The switching element can be electrically opened or closed by the aid of, for example, a MOS transistor. The switch control circuit 54 transmits an electric signal to the switch 53 to be controlled in the open/close operation, and to select an arbitrary switching element.

The switching element of the switch 53 is selected so that the voltage across the adjustment resistive element 47 is adjusted by the voltage divided ratio of the multi-stage series resistor 53. With the above configuration, an intermediate voltage between the temperature sensitive resistive element 9 and the temperature sensitive resistive element 10, which is inputted to the differential amplifier circuit 19, can be arbitrarily adjusted. According to this embodiment, even if the resistance of the resistive elements that configure the bridge circuit is varied, it is possible to adjust the balance.

Additionally, a current hardly flows through the wiring portion that is inputted to the buffers 50 and 51 from across adjustment resistor 47. Accordingly, the bridge circuit is not unbalanced by the contact resistance such as the wire bonding. Also, since the resistive elements that constitute the bridge circuit are connected to each other within the sensor element, no contact resistance of the wire bonding is inserted within the bridge. Accordingly, the contact resistance of the wiring bonding is not changed, and the temperature of the heat resistive element can be held constant under the feedback control for a long period of time without suffering from a change in the contact resistance of the wire bonding.

(Sixth Embodiment)

Figure 24:
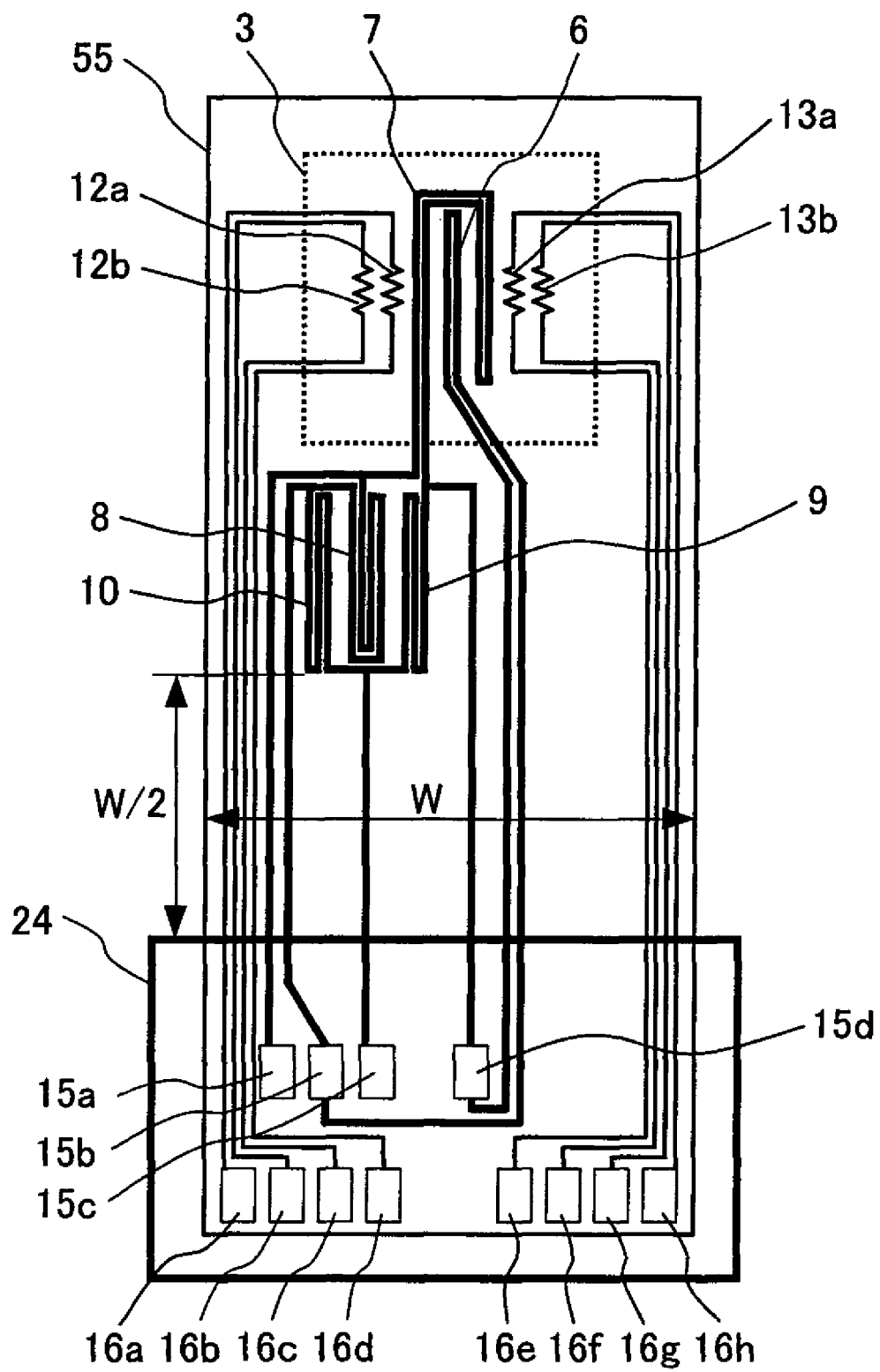
FIG. 24 is a plan view showing a sensor element according to a sixth embodiment.

FIG. 24 shows a plan view of a sensor element 55 according to this embodiment. The sensor element 55 is mounted on the base plate on which the driver circuit is formed. In this situation, in order to electrically connect the sensor element 55 and the driver circuit to each other, a gold wire bonding is used. In order to protect the gold wire bonding, the sealant 24 such as an epoxy resin is coated on the gold wire bonding. The configuration of the sensor element 55 is the same as that of the first embodiment.

In this embodiment, when it is defined that the lateral width of the sensor element 55 is W, the diaphragm 3, and the heat resistive elements 7, 8, 9, and 10 on the sensor element 55 are formed at position apart from the sealant 24 that is coated so as to cover the terminal portions 15a to 15d, and 16a to 16h of the sensor element 55 by a W/2 or more.

Figure 25:
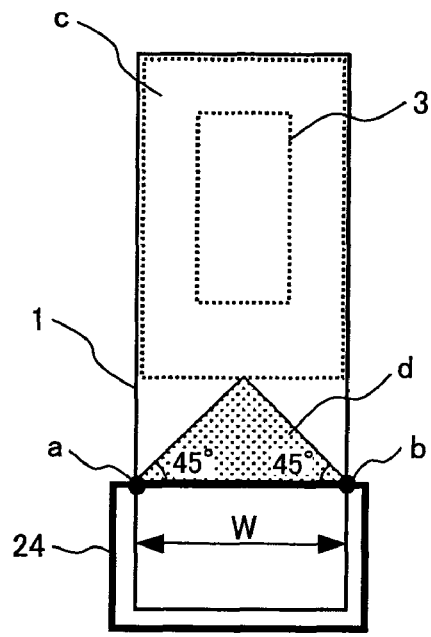
FIG. 25 is a layout diagram showing the sensor element according to the sixth embodiment.

FIG. 25 shows a layout of the measurement element 55. When the sealant is coated, a large stress is applied to particularly points a and b at both ends of the sensor element in the widthwise direction. The stress that is developed at the points a and b is spread toward the measurement substrate 55. In particular, a relatively large stress is applied to an area d in the figure. The area d is an area of an isosceles triangle with a base between the points a and b and with an angle of 45 degrees at the points a and b. For that reason, it is preferable that the resistive element to be formed on the substrate of the sensor element 55 is formed in an area c apart from the sealant 24 by W/2 or longer. Also, in the case where the bridge circuit is formed on the resistive elements, the connections of them are executed within the area c. In this embodiment, the heat resistive element 7, and the temperature sensitive resistive elements 8, 9, and 10 constitute the bridge circuit, and are connected to each other within the area c. Likewise, the diaphragm 3 is apart from the sealant 24 by W/2 or longer.

What is claimed is:

1. A thermal type air flow sensor for measuring a flow rate of a fluid, including:
   a flow-rate measuring sensor element having a bridge circuit including first, second, third, and fourth temperature sensitive resistive elements and an adjustment resistor which have a temperature dependency by which resistance changes according to temperature, wherein the flow-rate measuring sensor element is formed on a semiconductor substrate, and the first, second, third, and fourth temperature sensitive resistive elements and the adjustment resistor are connected in a form of a bridge circuit on the semiconductor substrate, and
   a driver circuit configured to receive a voltage across the adjustment resistor outside the semiconductor substrate, and to adjust the voltage across the adjustment resistor in a balance adjustment for the bridge circuit, further adjusting an intermediate voltage between the third temperature sensitive resistive element and the fourth temperature sensitive resistive element.

2. The thermal type flow sensor according to claim 1, wherein the driver circuit has switching elements configured for controlled open/close operation by an electric signal to variably adjust the voltage across the adjustment resistor as the intermediate voltage.

3. The thermal flow type sensor according to claim 2, wherein the driver circuit further has a switch control circuit configured to transmit an electric signal to a switch, the switch control circuit comprising said switching elements to be controlled in the open/close operation and to select an arbitrary switching element.

4. The thermal type flow sensor according to claim 3, wherein the selected switching element of the switch is selected so that the voltage across the adjustment resistor is adjusted by a voltage divided ratio of a multistage series resistor including the third and fourth temperature sensitive resistive elements.

5. The thermal type flow sensor according to claim 1, wherein the bridge circuit comprises a first series circuit having the first and second temperature sensitive resistive elements connected to each other in series, and a second series circuit having the third and fourth temperature sensitive resistive elements connected to each other in series with the adjustment resistor between the third and fourth temperature sensitive resistive elements, and configured to connect the first series circuit and the second series circuit to each other in parallel by a pattern formation on the semiconductor.

6. The thermal type flow sensor according to claim 1, wherein the driver circuit includes buffers which are configured to sense the voltage across the adjustment resistor while eliminating an influence of the wiring resistance.

7. The thermal type flow sensor according to claim 5, wherein the thermal type flow sensor further comprises a voltage divided circuit configured to variably adjust the voltage across the adjustment resistor which is taken as the intermediate voltage between the third and fourth temperature sensitive resistive elements of the second series circuit, the voltage divided circuit being provided outside the semiconductor substrate, and the driver circuit configured to control current flowing through the first temperature sensitive resistive element based on a difference between the intermediate voltage of the second series circuit taken through the voltage divided circuit and an intermediate voltage of the first series circuit.

8. The thermal type flow sensor according to claim 1, wherein the flow-rate measuring sensor element has a resistive element connected to the bridge circuit in parallel.

9. The thermal type flow sensor according to claim 8, wherein the resistive element is a heat resistive element.

10. The thermal type flow sensor according to claim 5, wherein the flow-rate measuring sensor element has a fifth resistive element connected to the bridge circuit in parallel.

11. The thermal type flow sensor according to claim 10, wherein the fifth resistive element is a heat resistive element.

* * * * *